(12) United States Patent
Nakamura (10) Patent No.: US 12,467,740 B2
(45) Date of Patent: Nov. 11, 2025

(54) IMAGING UNIT AND MEASUREMENT DEVICE

(71) Applicant: HAMAMATSU PHOTONICS K.K., Hamamatsu (JP)

(72) Inventor: Tomonori Nakamura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 431 days.

(21) Appl. No.: 17/797,206

(22) PCT Filed: Jan. 4, 2021

(86) PCT No.: PCT/JP2021/000041
§ 371 (c)(1),
(2) Date: Aug. 3, 2022

(87) PCT Pub. No.: WO2021/161684
PCT Pub. Date: Aug. 19, 2021

(65) Prior Publication Data
US 2023/0061667 A1    Mar. 2, 2023

(30) Foreign Application Priority Data
Feb. 13, 2020  (JP) .................................. 2020-022724

(51) Int. Cl.
*G01B 11/06*    (2006.01)
*G01B 15/02*    (2006.01)
(Continued)

(52) U.S. Cl.
CPC .......... *G01B 11/06* (2013.01); *G01B 11/0608* (2013.01); *G01B 11/0633* (2013.01);
(Continued)

(58) Field of Classification Search
None
See application file for complete search history.

(56) References Cited

U.S. PATENT DOCUMENTS

| 5,726,756 A | 3/1998 | Aki et al. |
| 7,061,601 B2 | 6/2006 | Meeks |

(Continued)

FOREIGN PATENT DOCUMENTS

| CN | 201993103 U | 9/2011 |
| CN | 102252762 A | 11/2011 |

(Continued)

OTHER PUBLICATIONS

International Preliminary Report on Patentability mailed Aug. 25, 2022 for PCT/JP2021/003768.

(Continued)

*Primary Examiner* — Shan Liu
(74) *Attorney, Agent, or Firm* — Faegre Drinker Biddle & Reath LLP (57) ABSTRACT

A measurement apparatus includes an inclined dichroic mirror configured to separate light from a sample by transmitting or reflecting the light according to wavelengths, a total reflection mirror configured to reflect one part of light either transmitted or reflected by the inclined dichroic mirror, an imaging element configured to photograph the other part of the light transmitted or reflected by the inclined dichroic mirror in a first imaging region and photograph light reflected by the total reflection mirror in a second imaging region different from the first imaging region, and a control apparatus configured to correct images photographed in the first imaging region and the second imaging region based on optical characteristics related to a change in transmittance and reflectance with respect to a wavelength in the inclined dichroic mirror.

7 Claims, 9 Drawing Sheets

(51) Int. Cl.
  *G01J 3/02*     (2006.01)
  *G01J 9/00*     (2006.01)
  *G02B 27/14*    (2006.01)

(52) U.S. Cl.
  CPC .......... *G01B 11/0691* (2013.01); *G01B 15/02* (2013.01); *G01J 3/027* (2013.01); *G01J 9/00* (2013.01); *G02B 27/141* (2013.01)

(56) References Cited

U.S. PATENT DOCUMENTS

| | | | |
|---|---|---|---|
| 9,587,930 | B2 | 3/2017 | Srocka |
| 10,499,662 | B1 | 12/2019 | Kristensen et al. |
| 2002/0127950 | A1 | 9/2002 | Hirose et al. |
| 2005/0094160 | A1 | 5/2005 | Murai et al. |
| 2006/0126170 | A1* | 6/2006 | Yamashita ............. G02B 21/16 359/398 |
| 2008/0068722 | A1 | 3/2008 | Chow |
| 2009/0316258 | A1 | 12/2009 | Uhl |
| 2010/0183188 | A1 | 7/2010 | Straehle et al. |
| 2012/0097864 | A1* | 4/2012 | Takahashi .......... G01N 21/6452 250/208.1 |
| 2014/0355006 | A1 | 12/2014 | Hotta |
| 2015/0350588 | A1* | 12/2015 | Lim ..................... H04N 9/3194 348/745 |
| 2016/0103311 | A1 | 4/2016 | Ito et al. |
| 2018/0038682 | A1 | 2/2018 | Smith et al. |
| 2019/0250078 | A1 | 8/2019 | Braun et al. |

FOREIGN PATENT DOCUMENTS

| | | | |
|---|---|---|---|
| CN | 102564588 | A | 7/2012 |
| CN | 103558221 | A | 2/2014 |
| CN | 103620340 | A | 3/2014 |
| CN | 104880258 | A | 9/2015 |
| CN | 105278228 | A | 1/2016 |
| CN | 106052871 | A | 10/2016 |
| CN | 107110640 | A | 8/2017 |
| CN | 107407748 | A | 11/2017 |
| CN | 110381230 | A | 10/2019 |
| CN | 110487192 | A | 11/2019 |
| CN | 110500963 | A | 11/2019 |
| DE | 102015218720 | A1 | 9/2016 |
| EP | 2076733 | B1 | 12/2012 |
| JP | H07-027520 | A | 1/1995 |
| JP | H10-047926 | A | 2/1998 |
| JP | 2001-108420 | A | 4/2001 |
| JP | 2002-196223 | A | 7/2002 |
| JP | 2003-014422 | A | 1/2003 |
| JP | 2004-069651 | A | 3/2004 |
| JP | 2006-276840 | A | 10/2006 |
| JP | 2007-101399 | A | 4/2007 |
| JP | 2008-039750 | A | 2/2008 |
| JP | 2008-175742 | A | 7/2008 |
| JP | 2008-292240 | A | 12/2008 |
| JP | 2009-145279 | A | 7/2009 |
| JP | 2009-287979 | A | 12/2009 |
| JP | 2010-025671 | A | 2/2010 |
| JP | 2011-027706 | A | 2/2011 |
| JP | 2011-039005 | A | 2/2011 |
| JP | 2011-226876 | A | 11/2011 |
| JP | 2012-137394 | A | 7/2012 |
| JP | 2014-235333 | A | 12/2014 |
| JP | 2014235332 | A | * 12/2014 |
| JP | 2015-211727 | A | 11/2015 |
| JP | 2016-031444 | A | 3/2016 |
| JP | 2017-009523 | A | 1/2017 |
| JP | 2017015526 | A | 1/2017 |
| JP | 2017-078724 | A | 4/2017 |
| JP | 2017-137394 | A | 8/2017 |
| JP | 6285597 | B1 | 2/2018 |
| JP | 2018-116032 | A | 7/2018 |
| JP | 2018-205132 | A | 12/2018 |
| JP | 2019-144217 | A | 8/2019 |
| KR | 20120081024 | A | 7/2012 |
| KR | 20130018164 | A | 2/2013 |
| KR | 20190027333 | A | 3/2019 |
| TW | 200601267 | A | 1/2006 |
| TW | 201015046 | A | 4/2010 |
| TW | 201122415 | A | 7/2011 |
| WO | WO-01/001070 | A1 | 1/2001 |
| WO | WO-2009/153067 | A2 | 12/2009 |
| WO | 2016/193037 | A1 | 12/2016 |
| WO | WO-2018/072447 | A1 | 4/2018 |

OTHER PUBLICATIONS

International Preliminary Report on Patentability mailed Aug. 25, 2022 for PCT/JP2021/000041.
International Preliminary Report on Patentability mailed Aug. 25, 2022 for PCT/JP2021/004743.
Office Action issued Mar. 19, 2025 in related U.S. Appl. No. 17/797,193.
European Communication pursuant to Article 94(3) EPC issued May 27, 2025 in Application No. 21753865.1.
Notice of Allowance in U.S. Appl. No. 17/797,193 dated Sep. 3, 2025.

* cited by examiner

IMAGING UNIT AND MEASUREMENT DEVICE

TECHNICAL FIELD

The present invention relates to an imaging unit and a measurement apparatus.

BACKGROUND ART

There has been a known imaging unit that separates light from an object according to wavelengths thereof, and photographs the separated wavelengths in different imaging regions (for example, see Patent Literature 1). In the imaging unit described in Patent Literature 1, the wavelengths are separated by a dichroic mirror, which is an optical element.

CITATION LIST

Patent Literature

Patent Literature 1: Japanese Unexamined Patent Publication No. 2014-235332

SUMMARY OF INVENTION

Technical Problem

The dichroic mirror described in Patent Literature 1 separates, with reference to a certain wavelength, light having a wavelength shorter than the wavelength and light having a wavelength longer than the wavelength, and the transmittance is generally 100% or 0% regardless of the wavelength. When such a dichroic mirror is used, for example, when separation of light having a narrow wavelength width is attempted, it is conceivable that desired separation cannot be performed according to the wavelength. As a configuration corresponding to separation of such light having a narrow wavelength width, there is a dichroic mirror having a wide wavelength band (having an edge shift width) in which the transmittance (and reflectance) changes according to a wavelength change. A dichroic mirror having an edge shift width can appropriately separate light having a narrow wavelength width.

Here, in a dichroic mirror having an edge shift width, for example, the optical characteristics change according to an incident angle of light. As a result, in an imaging unit using a dichroic mirror having an edge shift width, there is concern that a wavelength of light cannot be accurately derived, and a correct photographed image cannot be obtained.

The invention has been made in view of the above circumstances, and an object of the invention is to provide an imaging unit and a measurement apparatus capable of accurately deriving a wavelength of light and acquiring an appropriate image.

Solution to Problem

An imaging unit according to an aspect of the invention includes a separation optical element configured to separate light from an object by transmitting or reflecting the light according to wavelengths, an edge shift width having a predetermined width, the edge shift width being a width of a wavelength band in which a transmittance and a reflectance change according to a change in wavelength, a reflection optical element configured to reflect one part of light either transmitted or reflected by the separation optical element, an imaging portion configured to photograph the other part of the light transmitted or reflected by the separation optical element in a first imaging region and photograph light reflected by the reflection optical element in a second imaging region different from the first imaging region, and a processing unit configured to correct images photographed in the first imaging region and the second imaging region based on optical characteristics related to a change in transmittance and reflectance with respect to a wavelength in the separation optical element.

In the imaging unit according to the aspect of the invention, the separation optical element, the edge shift width of which has the predetermined width, is used, and the photographed images are corrected based on the optical characteristics related to a change in transmittance and reflectance with respect to a wavelength in the separation optical element. When the separation optical element, the edge shift width of which has the predetermined width, is used, even though light having a narrow wavelength width can be appropriately separated, for example, there is concern that it may be impossible to accurately derive a wavelength of light and acquire an appropriate image since the optical characteristics change depending on the incidence angle of light on the separation optical element. In this respect, in the imaging unit according to the aspect of the invention, since the images photographed in the first and second imaging regions are corrected based on the optical characteristics related to the change in transmittance and reflectance with respect to the wavelength, that is, the characteristics related to the edge shift width of the separation optical element, it is possible to acquire a photographed image corrected in consideration of the optical characteristics peculiar to the separation optical element having the edge shift width. As a result, it is possible to appropriately derive a wavelength of light separated by the separation optical element (light photographed in the first and second imaging regions), and to acquire appropriate (accurate) images.

The processing unit may store in advance correction data considering optical characteristics related to a change in transmittance and reflectance with respect to a wavelength in the separation optical element, and correct images photographed in the first imaging region and the second imaging region using the correction data. According to such a configuration, it is possible to easily and appropriately correct the photographed image based on the correction data stored in advance.

The processing unit may receive correction data considering optical characteristics related to a change in transmittance and reflectance with respect to a wavelength in the separation optical element, and correct images photographed in the first imaging region and the second imaging region using the correction data. According to such a configuration, for example, the photographed image can be appropriately corrected without preparing the correction data in advance based on the correction data obtained by software executed or input from the outside such as the Internet.

The processing unit may correct uneven color caused by an incident angle of light on the separation optical element. When a separation optical element having an edge shift width is used, there is a problem in that the optical characteristics of the separation optical element change according to the incidence angel on the separation optical element, and uneven color occurs in the photographed image. In this respect, by correcting the uneven color, it is possible to acquire an appropriate image in which the uneven color is reduced.

The processing unit may correct a shift of a detection wavelength caused by a boundary between a wavelength band in which a transmittance and a reflectance change according to a change in wavelength and a wavelength band in which the transmittance and the reflectance do not change. Such a boundary has optical characteristics different from those in a wavelength band in which the transmittance, etc. changes according to the change in wavelength. Therefore, when a wavelength is derived using the same calculation formula as that for the wavelength band in which the transmittance, etc. changes according to the change in wavelength, there is concern that a calculation result may be different from the original wavelength. In this regard, by correcting the shift of the detection wavelength caused by such a boundary, a wavelength of light can be accurately derived and an appropriate image can be acquired.

The imaging portion may be a single imaging element having the first imaging region and the second imaging region. As a result, a plurality of photographed images can be obtained by a simple configuration using the single imaging element.

A measurement apparatus according to an aspect of the invention includes the imaging unit described above, and an analysis unit configured to analyze a processing result in the imaging unit including an image corrected by the processing unit.

Advantageous Effects of Invention

According to the invention, it is possible to accurately derive a wavelength of light and acquire an appropriate image.

DESCRIPTION OF EMBODIMENTS

Hereinafter, an embodiment of the invention will be described in detail with reference to the drawings. In each figure, the same or corresponding parts are designated by the same reference symbols, and duplicate description will be omitted.

Figure 1:
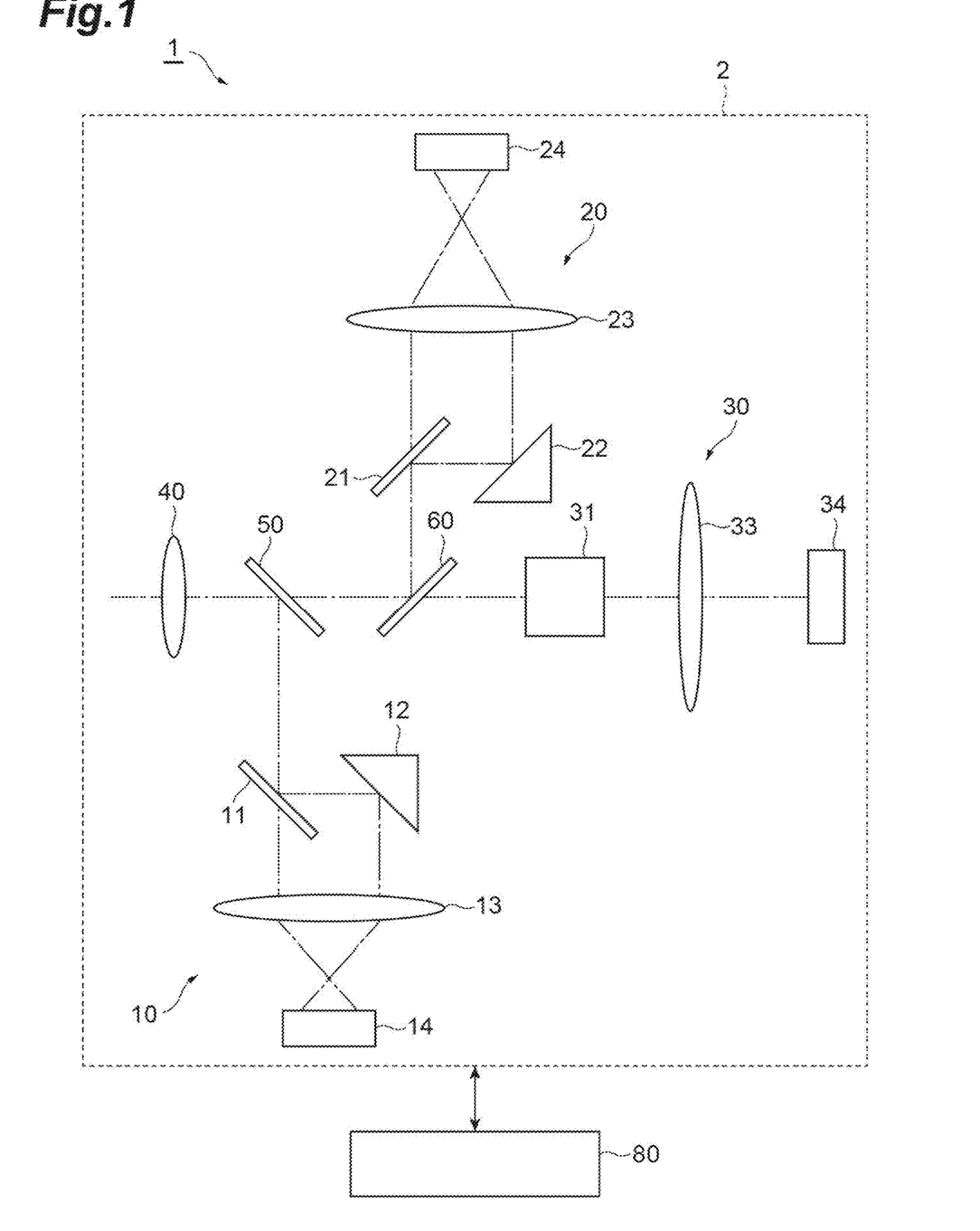
FIG. 1 is a plan view schematically illustrating a measurement apparatus according to an embodiment of the invention.

FIG. 1 is a plan view schematically illustrating a measurement apparatus 1 according to the present embodiment. The measurement apparatus 1 is a camera unit (imaging unit) configured to be able to photograph a sample. The measurement apparatus 1 separates light from the sample (for example, observation light) according to wavelength components, and photographs light of each of the wavelength components using imaging elements 14, 24, and 34, each of which corresponds to each wavelength component. The measurement apparatus 1 determines quality of the sample by analyzing images (photographing result) photographed by the imaging elements 14, 24, and 34. For example, the sample may be a light-emitting element such as an LED, a mini LED, a μLED, an SLD element, a laser element, a vertical laser element (VCSEL), or an OLED, or a light-emitting element, an emission wavelength of which is adjusted by a fluorescent substance including nanodots, etc. When the sample is a light-emitting element, determining the quality of the sample means, for example, determining the quality of the sample based on uneven color information among a plurality of light-emitting elements.

As illustrated in FIG. 1, the measurement apparatus 1 includes a camera system 2 and a control apparatus 80 (a processing unit and an analysis unit). Details of the camera system 2 will be described with reference to FIG. 2. FIG. 1 is a plan view of the measurement apparatus 1 including the camera system 2, and FIG. 2 is a side view of the camera system 2.

Figure 2:
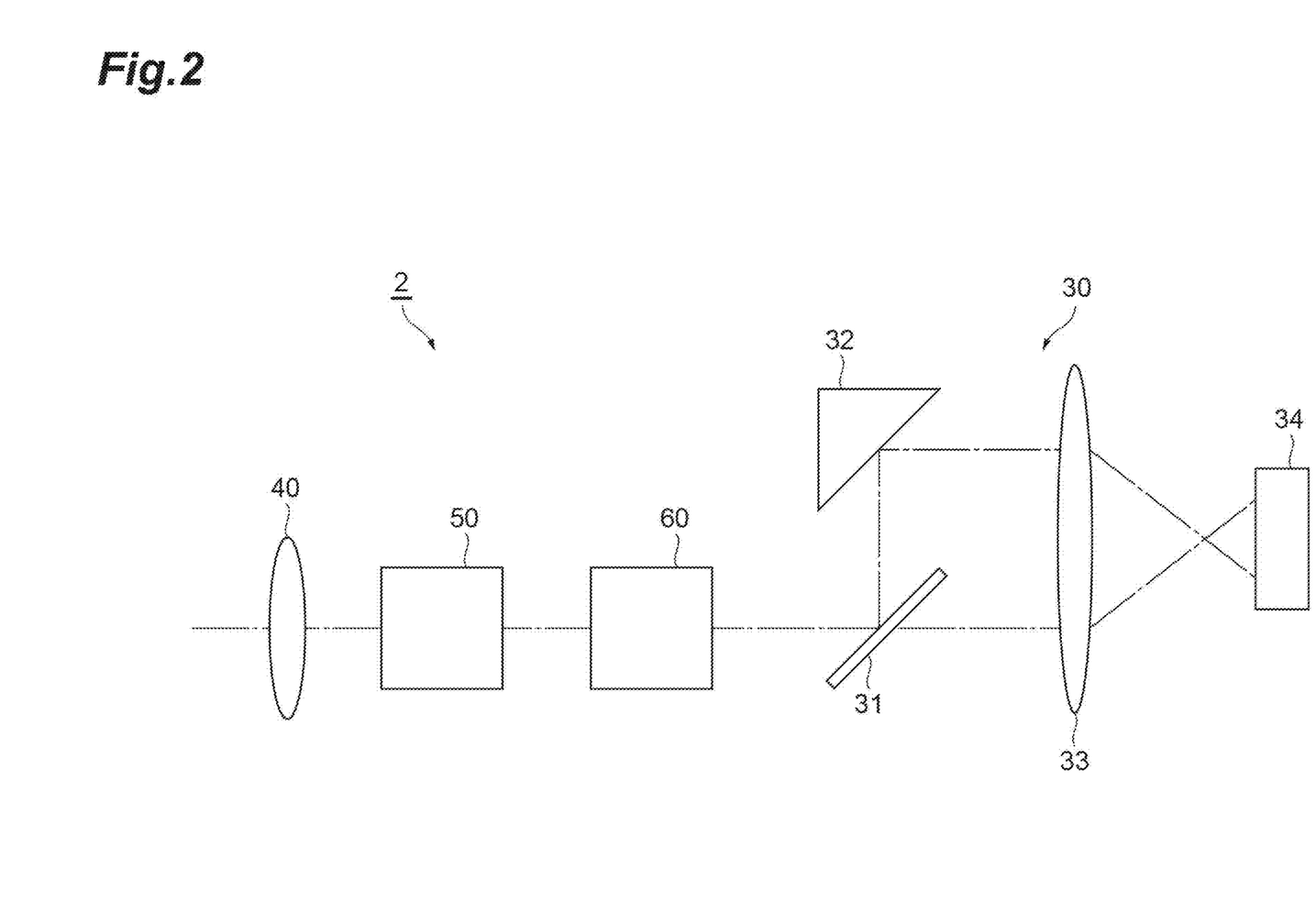
FIG. 2 is a side view schematically illustrating a camera system included in the measurement apparatus of FIG. 1.

As illustrated in FIGS. 1 and 2, the camera system 2 includes a first imaging unit 10, a second imaging unit 20, a third imaging unit 30, an infinity correction lens 40, a dichroic mirror 50, and a dichroic mirror 60. Although not illustrated in FIGS. 1 and 2, the camera system 2 includes an objective lens (not illustrated) for observing a sample and one or more bandpass filters (not illustrated) for removing light outside a desired wavelength range (not illustrated). The camera system 2 separates light into wavelength components corresponding to the three primary colors, and photographs light of each wavelength component. For example, the first imaging unit 10 photographs light of 380 to 500 nm including a blue wavelength component. Further, the second imaging unit 20 photographs light of 500 to 650 nm including a green wavelength component. Further, the third imaging unit 30 photographs light of 650 to 830 nm including a red wavelength component.

The infinity correction lens 40 is a collimator lens that converts incident light from the sample into parallel light. The infinity correction lens 40 is aberration-corrected so that parallel light can be obtained. The parallel light output from the infinity correction lens 40 is incident on the dichroic mirror 50.

The dichroic mirror 50 is a mirror generated using a specific optical material, and separates light from the sample by transmitting or reflecting the light according to wavelengths. For example, the dichroic mirror 50 reflects light having a specific wavelength and transmits light having other wavelengths. Specifically, for example, the dichroic mirror 50 reflects light having a wavelength of less than 500 nm, and transmits light having other wavelengths (light having a wavelength of 500 nm or more). The light reflected by the dichroic mirror 50 is guided to the first imaging unit 10. The light transmitted through the dichroic mirror 50 is incident on the dichroic mirror 60.

The dichroic mirror 60 is a mirror generated using a specific optical material, and separates light from the sample by transmitting or reflecting the light according to wavelengths. For example, the dichroic mirror 60 reflects light having a specific wavelength and transmits light having other wavelengths. Specifically, for example, the dichroic mirror 60 reflects light having a wavelength of 500 nm or more and less than 650 nm, and transmits light having other wavelengths (light having a wavelength of 650 nm or more). The light reflected by the dichroic mirror 60 is guided to the second imaging unit 20. The light transmitted through the dichroic mirror 60 is guided to the third imaging unit 30.

The first imaging unit 10 includes an inclined dichroic mirror 11 (separation optical element), a total reflection mirror 12 (reflection optical element), an imaging lens 13, and an imaging element 14 (imaging portion).

Figure 3:
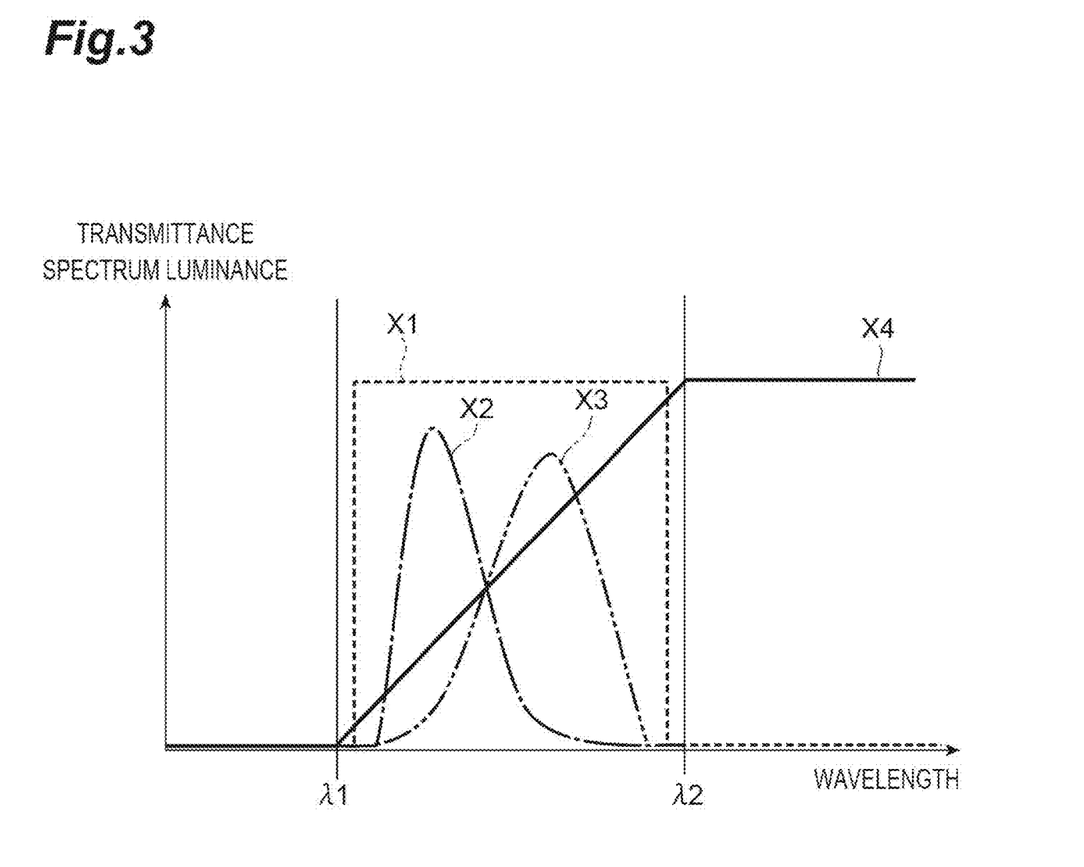
FIG. 3 is a diagram describing a light spectrum and characteristics of an inclined dichroic mirror.

The inclined dichroic mirror 11 is a mirror generated using a specific optical material, and separates light from the sample by transmitting or reflecting the light according to wavelengths. For example, the inclined dichroic mirror 11 reflects light having a specific wavelength and transmits light having other wavelengths. Specifically, among light rays, which have wavelengths less than 500 nm, reflected by the dichroic mirror 50, the inclined dichroic mirror 11 reflects light rays of 380 to 500 nm and transmits light rays having other wavelengths. FIG. 3 is a diagram describing a light spectrum and characteristics of the inclined dichroic mirror 11. In FIG. 3, the horizontal axis indicates the wavelength, and the vertical axis indicates the spectral intensity (in the case of a spectrum of light) and the transmittance (in the case of the inclined dichroic mirror 11). As indicated by a characteristic X4 of the inclined dichroic mirror 11 of FIG. 3, in the inclined dichroic mirror 11, the transmittance (and reflectance) of light gently changes according to a wavelength change in a specific wavelength band (wavelength band of a wavelength $\lambda_1$ to a wavelength $\lambda_2$), and the transmittance (and reflectance) of light is constant regardless of the wavelength change in a wavelength band other than the specific wavelength band (that is, a lower wavelength side of the wavelength $\lambda_1$ and a higher wavelength side of the wavelength $\lambda_2$). In other words, in the specific wavelength band (wavelength band of the wavelength $\lambda_1$ to the wavelength $\lambda_2$), the light transmittance changes monotonically increasing (reflectance decreases monotonically) according to the wavelength change. There is a negative correlation between transmittance and reflectance in which, when one changes in a direction of increasing, the other changes in a direction of decreasing. Thus, hereinafter, "transmittance (and reflectance)" may be simply described as "transmittance". Note that "the light transmittance is constant regardless of the wavelength change" includes not only the case where the transmittance is completely constant, but also, for example, the case where the change in transmittance with respect to a wavelength change of 1 nm is 0.1% or less. On the lower wavelength side of the wavelength $\lambda_1$, the light transmittance is approximately 0% regardless of the wavelength change, and on the higher wavelength side of the wavelength $\lambda_2$, the light transmittance is approximately 100% regardless of the wavelength change. Note that "the light transmittance is approximately 0%" includes the case where the transmittance is about 0%+10%, and "the light transmittance is approximately 100%" includes the case where the transmittance is about 100%-10%. Further, in the following, a width of a wavelength band in which the light transmittance changes according to the wavelength change may be described as "edge shift width". As described above, the inclined dichroic mirror 11 is a separation optical element having an edge shift width, which is a width of a wavelength band in which the transmittance changes according to the wavelength change, having a predetermined width (width of the wavelength $\lambda_1$ to the wavelength $\lambda_2$).

The total reflection mirror 12 is an optical element that reflects light reflected by the inclined dichroic mirror 11 in a direction to the imaging lens 13.

The imaging lens 13 is a lens that forms an image of each of a light ray transmitted through the inclined dichroic mirror 11 and a light ray reflected by the inclined dichroic mirror 11 and further reflected by the total reflection mirror 12, and guides these light rays to the imaging element 14.

The imaging element 14 photographs the light transmitted through the inclined dichroic mirror 11 in a first imaging region, and photographs the light reflected by the inclined dichroic mirror 11 and further reflected by the total reflection mirror 12 in a second imaging region different from the first imaging region. The imaging element 14 detects the image formed by the imaging lens 13, thereby photographing the light transmitted through the inclined dichroic mirror 11 and the light reflected by the total reflection mirror 12. The imaging element 14 is an imaging element for photographing light of 380 to 500 nm, and is, for example, an area image sensor such as a CCD or an MOS. Further, the imaging element 14 may include a line sensor or a TDI (Time Delay Integration) sensor. In the present embodiment, the imaging element 14 is described as a single imaging element having the first imaging region and the second imaging region. However, an imaging element related to the first imaging region and an imaging element related to the second imaging region may be separately provided (two sets may be provided). In this case, two sets of imaging lenses are provided to correspond to the imaging elements. The imaging element 14 outputs an image, which is a photographing result, to the control apparatus 80.

The second imaging unit 20 includes a configuration similar to a configuration included in the first imaging unit 10, and includes an inclined dichroic mirror 21 (separation optical element), a total reflection mirror 22 (reflection optical element), an imaging lens 23, and an imaging element 24 (imaging portion). The inclined dichroic mirror 21 has a similar configuration to that of the inclined dichroic mirror 11 of the first imaging unit 10 except that the inclined dichroic mirror 21 reflects light rays of 500 to 650 nm among light rays of 500 nm or more and less than 650 nm reflected by the dichroic mirror 60, and transmits light rays of the other wavelengths. Further, the imaging element 24 has a similar configuration to that of the imaging element 14 of the first imaging unit 10 except that the imaging element 24 is an imaging element for photographing light of 500 to 650 nm.

The third imaging unit 30 includes a configuration similar to a configuration included in the first imaging unit 10, and includes an inclined dichroic mirror 31 (separation optical element), a total reflection mirror 32 (reflection optical element), an imaging lens 33, and an imaging element 34 (imaging portion). The inclined dichroic mirror 31 has a similar configuration to that of the inclined dichroic mirror 11 of the first imaging unit 10 except that the inclined dichroic mirror 31 reflects light rays of 650 to 830 nm among light rays of 650 nm or more transmitted through the dichroic mirror 60, and transmits light rays of the other wavelengths. Further, the imaging element 24 has a similar configuration to that of the imaging element 14 of the first imaging unit 10 except that the imaging element 24 is an imaging element for photographing light of 650 to 830 nm.

Returning to FIG. 1, the control apparatus 80 is a computer, and is physically configured to include a memory such as a RANI or a ROM, a processor (arithmetic circuit) such as a CPU, a communication interface, and a storage unit such as a hard disk. The control apparatus 80 functions by executing a program stored in a memory on a CPU of a computer system. The control apparatus 80 may include a microcomputer or an FPGA.

The control apparatus 80 calculates and outputs the center of gravity of an emission wavelength based on the amount of light of each pixel (each pixel of an image formed in a field of view) of an image, which is a photographing result, based on a photographing result obtained in each of the first imaging unit 10, the second imaging unit 20, and the third imaging unit 30. Hereinafter, an example of a calculation principle of the center of gravity of the emission wavelength will be described in detail with reference to FIG. 2. Note that since calculation principles of the centers of gravity of the emission wavelengths based on the photographing results of the first imaging unit 10, the second imaging unit 20, and the third imaging unit 30 are the same, calculation of the center of gravity of the emission wavelength based on the photographing result of the first imaging unit 10 will be described as an example.

As described above, it is presumed that the inclined dichroic mirror 11 reflects all light on the lower wavelength side of the wavelength $\lambda_1$ and transmits all light on the higher wavelength side of the wavelength $\lambda_2$, and the light transmittance linearly changed according to the wavelength in the wavelength band of the wavelength $\lambda_1$ to the wavelength $\lambda_2$. In this case, in the relationship between the wavelengths $\lambda_1$ and $\lambda_2$, the transmittance $h(\lambda)$ is expressed by the following Equation (1), and the reflectance $1-h(\lambda)$ is expressed by the following Equation (2).

$$h(\lambda)=(\lambda-\lambda_1)/(\lambda_2-\lambda_1) \qquad (1)$$

$$1-h(\lambda)=(\lambda_2-\lambda)/(\lambda_2-\lambda_1) \qquad (2)$$

Further, it is clear that a wavelength $\lambda_{50\%}$ at which the reflectance is 50% is expressed by the following Equation (3).

$$\lambda_{50\%}=(\lambda_2+\lambda_1)/2 \qquad (3)$$

When a certain emission spectrum $f(\lambda)$ is indicated by a waveform X2 of FIG. 3, is between $\lambda_1$ and $\lambda_2$, and is negligible at a wavelength shorter than $\lambda_1$ and at a wavelength longer than $\lambda_2$ (for example, when characteristics of a bandpass filter (not illustrated) are indicated by a waveform $\lambda_1$ of FIG. 3 and a wavelength band of the emission spectrum $f(\lambda)$ is limited), and when it is presumed that the amount of reflected light and the amount of transmitted light are equal to each other, the following Equation (4) is satisfied.

$$\int f(\lambda)h(\lambda)d\lambda=\int f(\lambda)(1-h(\lambda))d\lambda \qquad (4)$$

When Equation (4) is transformed, the following Equation (5) is obtained.

$$2\int f(\lambda)h(\lambda)d\lambda=\int f(\lambda)d\lambda \qquad (5)$$

When Equation (1) is substituted into Equation (5), $2\int f(\lambda)(\lambda-\lambda_1)/(\lambda_2-\lambda_1)d\lambda=\int f(\lambda)d\lambda$ is obtained. Further, when the both sides are divided by $2\int f(\lambda)d\lambda/(\lambda_2-\lambda_1)$, the following equations are obtained.

$$\int f(\lambda)(\lambda-\lambda_1)d\lambda/\int f(\lambda)d\lambda = (\lambda_2-\lambda_1)/2 \qquad (6)$$

$$\int f(\lambda)\lambda d\lambda/\int f(\lambda)d\lambda = (\lambda_2+\lambda_1)/2$$

Considering Equation (3), it is clear that the right side of Equation (6) is $\lambda_{50\%}$, and the left side thereof is the center of gravity of $f(\lambda)$, which is generally an arbitrary function. Such a left side of Equation (6) is set to $\lambda_f$. From the above description, for an arbitrary spectrum through a dichroic mirror having a transmittance linearly inclined with respect to wavelength, when the amount of transmitted light and the amount of reflected light are equal to each other, the center of gravity $\lambda_f$ of the spectrum is indicated by $\lambda_{50\%}$.

Next, a second emission spectrum $g(\lambda)$ (waveform X3 of FIG. 3) is considered. As for the emission spectrum $g(\lambda)$, the spectrum is completely included between $\lambda_1$ and $\lambda_2$. Now, a difference between the emission spectra $f(\lambda)$ and $g(\lambda)$ in standardized difference between transmitted light and reflected light is calculated. In $f(\lambda)$, transmitted light is set to $T_f$, reflected light is set to $R_f$, the total amount of light is set to $A_f$, and a difference between the transmitted light and the reflected light is set to $D_f$. Further, in $g(\lambda)$, transmitted light is set to $T_g$, reflected light is set to $R_g$, the total amount of light is set to $A_g$, and a difference between the transmitted light and the reflected light is set to $D_g$. Further, the center of gravity of $g(\lambda)$ is $\lambda_g$. In this instance, $T_f$, $R_f$, $T_g$, and $R_g$ are measured values, and $A_f$, $A_g$, $D_f$, and $D_g$ are values that can be calculated directly from the measured values. Each of these values is indicated by the following equations.

$$T_f=\int f(\lambda)h(\lambda)d\lambda=\int f(\lambda)(\lambda-\lambda_1)/(\lambda_2-\lambda_1)d\lambda \qquad (7)$$

$$T_g=\int g(\lambda)h(\lambda)d\lambda=\int g(\lambda)(\lambda-\lambda_1)/(\lambda_2-\lambda_1)d\lambda \qquad (8)$$

$$R_f=\int f(\lambda)(1-h(\lambda))d\lambda=\int f(\lambda)(\lambda_2-\lambda)/(\lambda_2-\lambda_1)d\lambda \qquad (9)$$

$$R_g=\int g(\lambda)(1-h(\lambda))d\lambda=\int g(\lambda)(\lambda_2-\lambda)/(\lambda_2-\lambda_1)d\lambda \qquad (10)$$

$$A_f=\int f(\lambda)d\lambda \qquad (11)$$

$$A_g=\int g(\lambda)d\lambda \qquad (12)$$

$$D_f = \qquad (13)$$
$$T_f - R_f = 2/(\lambda_2-\lambda_1) * \int \lambda f(\lambda)d\lambda - (\lambda_2+\lambda_1)/(\lambda_2-\lambda_1) * \int f(\lambda)d\lambda\ldots$$

$$D_g = \qquad (14)$$
$$T_g - R_g = 2/(\lambda_2-\lambda_1) * \int \lambda g(\lambda)d\lambda - (\lambda_2+\lambda_1)/(\lambda_2-\lambda_1) * \int g(\lambda)d\lambda\ldots$$

Here, standardizing the difference between the transmitted light and the reflected light corresponds to dividing $D_f$ by $A_f$ and $D_g$ by $A_g$. When the difference is set to R, the following Equation (15) is satisfied.

$$R = D_g/A_g - D_f/A_f = \qquad (15)$$
$$\left\{\int g(\lambda)\lambda d\lambda/\int g(\lambda)d\lambda - \int f(\lambda)\lambda d\lambda/\int f(\lambda)d\lambda\right\}*2/(\lambda_2-\lambda_1) =$$
$$2(\lambda_g-\lambda_f)/(\lambda_2-\lambda_1)$$

When a difference between the wavelength center of gravity $\lambda_f$ of the emission spectrum $f(\lambda)$ and the wavelength center of gravity $\lambda_g$ of the emission spectrum $g(\lambda)$ is set to $\delta\lambda$, the following Equation (16) and Equation (17) are satisfied.

$$R=2\delta\lambda/(\lambda_2-\lambda_1) \qquad (16)$$

$$\delta\lambda=R(\lambda_2-\lambda_1)/2 \qquad (17)$$

As described above, it is found that a difference between the centers of gravity of two arbitrary spectra $f(\lambda)$ and $g(\lambda)$ is obtained from calculation considering the amount of transmitted light and the amount of reflected light.

Further, when the center of gravity of $f(\lambda)$ is $\lambda_{50\%}$, the amount of reflected light and the amount of transmitted light become equal to each other, and thus $D_f$ becomes 0. That is, the wavelength center of gravity $\lambda_g$ of the arbitrary spectrum $g(\lambda)$ is indicated by the following Equation (18).

$$\lambda_g = \delta\lambda + \lambda_{50\%} \tag{18}$$

In this way, the center of gravity of the emission spectrum can be calculated from a design value of a filter, the amount of transmitted light, and the amount of reflected light. Based on the above principle, the center of gravity of a wavelength of light incident on each pixel can be obtained with high accuracy.

Here, when determining the center of gravity of a wavelength of light, it is conceivable that derivation accuracy decreases due to, for example, the following factors. First, since the periphery of the lens of the imaging element 14 is dimmed, there is concern that the center of gravity of the original wavelength of light cannot be appropriately obtained in pixels at such a location. Second, when the optical characteristics of the inclined dichroic mirror 11 change depending on the incident angle of light, there is concern that the center of gravity of the wavelength of light cannot be properly obtained (uneven color due to the incident angle may occur) depending on the incident angle of light (position of pixels in a field of view). Third, there is concern that wavelength shift may occur depending on the sensitivity of the lens and the imaging element 14. To address these problems, for example, it is conceivable to calculate the incident angle of light on the inclined dichroic mirror 11 in advance and make corrections according to the incident angle (solution to the second problem described above). Further, for example, it is conceivable to perform shading correction by applying a uniform monochromatic laser beam to an irradiation surface (white object) and performing gain correction for each pixel so that the irradiation surface becomes uniform (solution to the first and second problems described above). Further, it is conceivable to appropriately obtain the center of gravity of the wavelength of the light by suppressing the inclination of the inclined dichroic mirror 11 and reflecting light at an angle closer to 90 degrees. Further, in the present embodiment, the following corrections are made.

That is, the control apparatus 80 may correct images photographed in the first imaging region and the second imaging region of the imaging element 14 based on the optical characteristics related to a change in transmittance and reflectance with respect to the wavelength in the inclined dichroic mirror 11. For example, the control apparatus 80 may store in advance correction data considering the optical characteristics related to the change in transmittance and reflectance with respect to the wavelength in the inclined dichroic mirror 11, and correct the images photographed in the first imaging region and the second imaging region using the correction data. The control apparatus 80 may receive correction data considering the optical characteristics related to the change in transmittance and reflectance with respect to the wavelength in the inclined dichroic mirror 11, and correct the images photographed in the first imaging region and the second imaging region using the correction data. The control apparatus 80 may receive the above-mentioned correction data by software executed or input from the outside such as the Internet.

Figure 4:
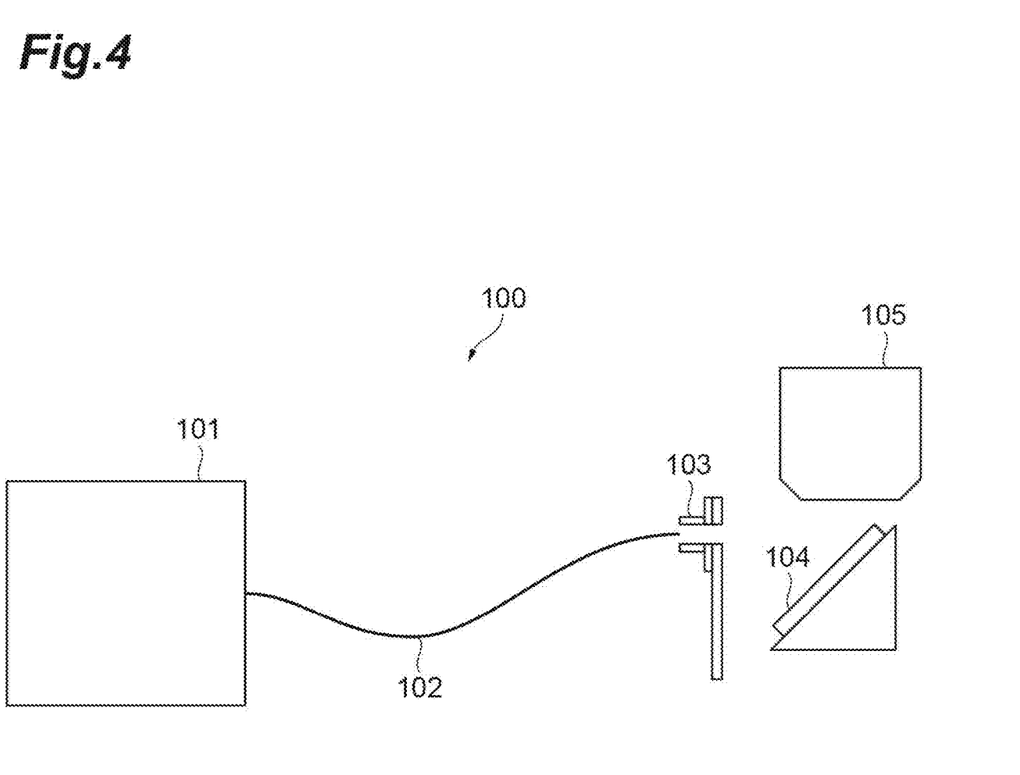
FIG. 4 is a diagram schematically illustrating a correction unit.
Figure 5:
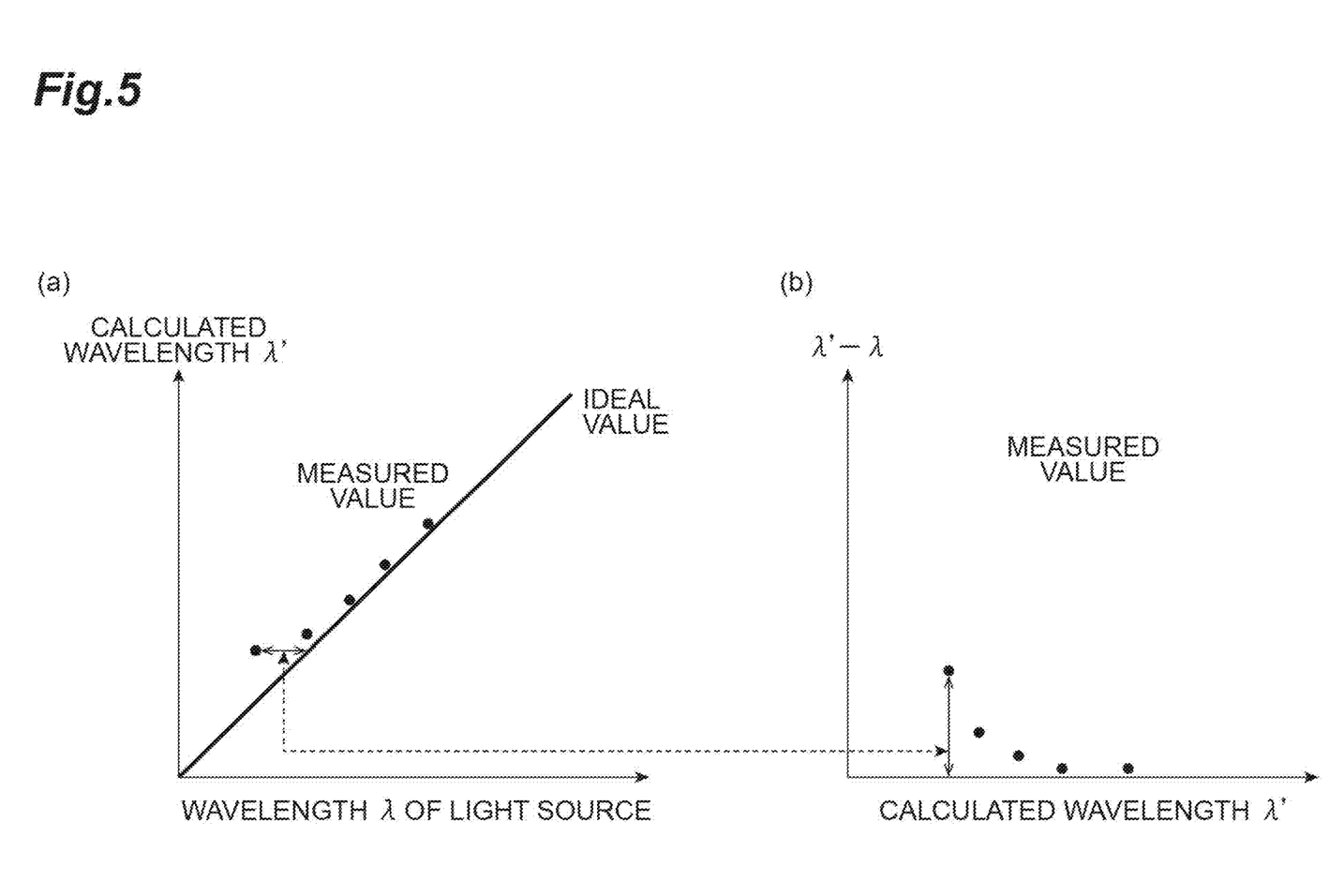
FIG. 5 is a graph for describing correction of a calculated wavelength.

Generation of the correction data will be described with reference to FIGS. 4 and 5. FIG. 4 is a diagram schematically illustrating a correction unit 100 for generating correction data. FIG. 5 is a graph for describing correction of a calculated wavelength (described later). Since processing related to generation of correction data is the same for the first imaging unit 10, the second imaging unit 20, and the third imaging unit 30, processing related to generation of correction data related to the first imaging unit 10 will be described below. As illustrated in FIG. 4, the correction unit 100 includes a light source 101, an optical fiber 102, an FC adapter 103, a diffuser plate 104, and an objective lens 105. The correction unit 100 is used when generating correction data related to the camera system 2 of the measurement apparatus 1. It is presumed that each configuration (see FIG. 2) of the above-mentioned camera system 2 is provided in a subsequent stage (downstream) of the objective lens 105 of the correction unit 100 (not illustrated in FIG. 4).

The light source 101 is, for example, a monochromatic/narrowband light source, a wavelength of which can be changed. Alternatively, the light source 101 may be a plurality of laser light sources having different wavelengths, may be an SLD/LED, or may include a white light source and a bandpass filter. The light source 101 can select, for example, five or more wavelengths in at least an inclination range of the inclined dichroic mirror 11 (range in which the light transmittance (and reflectance) gently changes according to the change in wavelength). Light emitted from the light source 101 is guided to the objective lens 105 via the optical fiber 102 and the diffuser plate 104. As a result, the light from the light source 101 can be observed by the objective lens 105.

When generating correction data, images in the first imaging region and the second imaging region of the imaging element 14 at each wavelength are acquired while changing a wavelength of light emitted from the light source 101 with the correction unit 100 described above set. Effects of offset, gain unevenness, etc. due to background light, etc. may be eliminated. Wavelength intervals may be approximately equal. Further, based on the images in the first imaging region and the second imaging region, the control apparatus 80 derives the wavelength center of gravity (calculated wavelength) at each wavelength. As illustrated in FIG. 5(a), the control apparatus 80 has a wavelength $\lambda$ of the light source 101 on the horizontal axis and a calculated wavelength $\lambda'$ on the vertical axis. Ideally, the wavelength $\lambda$ of the light source 101 and the calculated wavelength $\lambda'$ are considered to have a linear relationship. However, in an example illustrated in FIG. 5(a), the calculated wavelength $\lambda'$ greatly deviates from an ideal value especially on a low wavelength side. Further, as illustrated in FIG. 5(b), the control apparatus 80 has the calculated wavelength $\lambda'$ on the horizontal axis and the calculated wavelength $\lambda'$–the wavelength $\lambda$ of the light source 101 on the vertical axis. Further, the control apparatus 80 can obtain an approximate curve N of the graph of FIG. 5(b) up to about the fourth order using, for example, the least squares method, etc., thereby appropriately correcting the calculated wavelength $\lambda'$ on the low wavelength side greatly deviating from the ideal value as described above. Specifically, the control apparatus 80 obtains a corrected calculated wavelength based on the calculated wavelength $\lambda'$ and a quaternary equation of the above-mentioned least squares method. For example, the control apparatus 80 obtains a corrected calculated wavelength by adding the calculated wavelength $\lambda'$ and a value of the quaternary equation.

The control apparatus 80 corrects uneven color caused by an incidence angel of light on the inclined dichroic mirror 11, for example, by using the correction data described above. Further, the control apparatus 80 uses, for example, the above-mentioned correction data to correct shift of a detection wavelength (calculated wavelength) caused by a boundary between a wavelength band in which the transmittance and the reflectance change according to the change in wavelength and a wavelength band in which the transmittance and the reflectance do not change. Such a boundary (wavelength band near $\lambda_1$ and near $\lambda_2$ in FIG. 3) may have different optical characteristics from those in a wavelength band in which the transmittance of the inclined dichroic mirror 11 changes according to the change in wavelength. Therefore, when the wavelength is derived using the same calculation formula as that for the wavelength band in which the transmittance changes according to the change in wavelength with respect to such a boundary, there is concern that a calculation result may be different from the original wavelength. In this regard, by using the correction data described above to correct the calculated wavelength $\lambda'$ that deviates from the ideal value, it is possible to appropriately correct the shift of the detection wavelength caused by the boundary. The control apparatus 80 determines the quality of the sample by analyzing a processing result including a corrected image.

Figure 6:
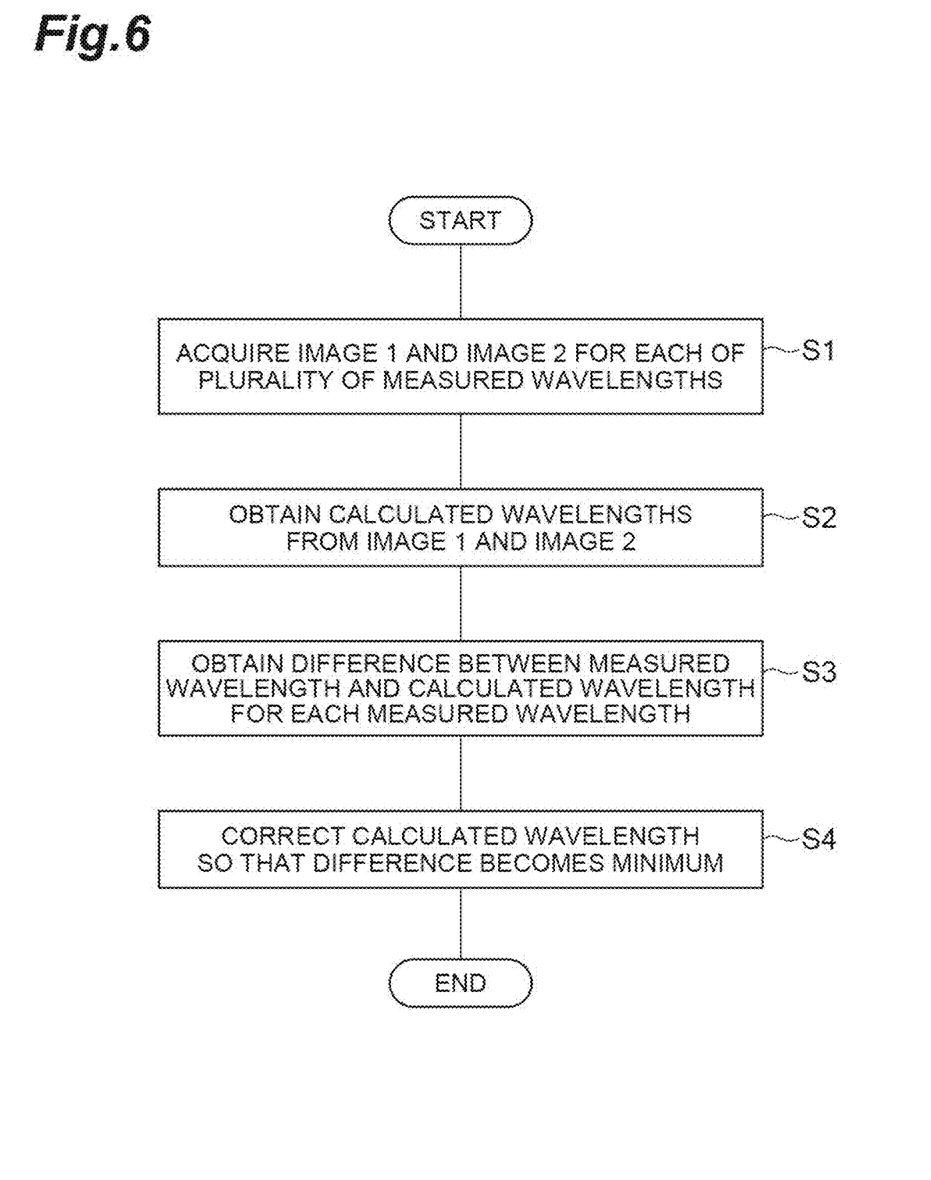
FIG. 6 is a flowchart of a correction method.

Next, a correction method using the correction data will be described with reference to FIG. 6. FIG. 6 is a flowchart of the correction method. As the premise that the process of FIG. 6 is performed, the correction unit 100 is installed upstream (previous stage) of the camera system 2.

As illustrated in FIG. 6, first, while changing a wavelength of light emitted from the light source 101, an image 1 in a first imaging region of the imaging element 14 and an image 2 in a second imaging region thereof are acquired for each of a plurality of measured wavelengths (step S1).

Subsequently, calculated wavelengths are obtained from the image 1 and the image 2 acquired in step S1 (step S2). Specifically, a wavelength center of gravity (calculated wavelength) at each wavelength is obtained based on the above-mentioned Equations (1) to (18).

Subsequently, a difference between a measured wavelength and a calculated wavelength is obtained for each measured wavelength (step S3). Then, the calculated wavelength is corrected by, for example, obtaining the least squares method, etc. up to about the fourth order so that the difference becomes the minimum (step S4). The correction method has been described above.

Note that the invention is not limited to calculating the wavelength center of gravity using the correction method of the above embodiment. For example, a conversion map may be generated by calculating a table including correction data in advance, and the wavelength center of gravity may be calculated based on a ratio of light entering a pixel corresponding to this conversion map.

Next, the action and effect of the present embodiment will be described.

The measurement apparatus 1 according to the present embodiment includes the inclined dichroic mirror 11 configured to separate light from a sample by transmitting or reflecting the light according to wavelengths of the light, and have an edge shift width, which is a width of a wavelength band in which the transmittance and the reflectance change according to a change in wavelength, having a predetermined width, the total reflection mirror 12 configured to reflect one part of light either transmitted or reflected by the inclined dichroic mirror 11, the imaging element 14 configured to photograph the other part of the light transmitted or reflected by the inclined dichroic mirror 11 in the first imaging region and photograph light reflected by the total reflection mirror 12 in the second imaging region different from the first imaging region, and the control apparatus 80 configured to correct images photographed in the first imaging region and the second imaging region based on optical characteristics related to a change in transmittance and reflectance with respect to a wavelength in the inclined dichroic mirror 11.

In the measurement apparatus 1, the inclined dichroic mirror 11, the edge shift width of which has the predetermined width, is used, and the photographed images are corrected based on the optical characteristics related to a change in transmittance and reflectance with respect to a wavelength in the inclined dichroic mirror 11. When the inclined dichroic mirror 11, the edge shift width of which has the predetermined width, is used, even though light having a narrow wavelength width can be appropriately separated, for example, there is concern that it may be impossible to accurately derive a wavelength of light and acquire an appropriate image since the optical characteristics change depending on the incidence angle of light on the inclined dichroic mirror 11. In this respect, in the measurement apparatus 1 according to the present embodiment, since the images photographed in the first and second imaging regions are corrected based on the optical characteristics related to the change in transmittance and reflectance with respect to the wavelength, that is, the characteristics related to the edge shift width of the inclined dichroic mirror 11, it is possible to acquire a photographed image corrected in consideration of the optical characteristics peculiar to the inclined dichroic mirror 11 having the edge shift width. As a result, it is possible to appropriately derive a wavelength of light separated by the inclined dichroic mirror 11 (light photographed in the first and second imaging regions), and to acquire appropriate (accurate) images.

The control apparatus 80 may store in advance correction data considering optical characteristics related to a change in transmittance and reflectance with respect to a wavelength in the inclined dichroic mirror 11, and use the correction data to correct images photographed in the first imaging region and the second imaging region. According to such a configuration, the photographed images can be easily and appropriately corrected based on the correction data stored in advance.

The control apparatus 80 may receive correction data considering optical characteristics related to a change in transmittance and reflectance with respect to a wavelength in the inclined dichroic mirror 11, and use the correction data to correct images photographed in the first imaging region and the second imaging region. According to such a configuration, for example, the photographed image can be appropriately corrected without preparing the correction data in advance based on the correction data obtained by software executed or input from the outside such as the Internet.

The control apparatus 80 may correct uneven color caused by the incidence angel of light on the inclined dichroic mirror 11. When a separation optical element having an edge shift width is used, there is a problem in that the optical characteristics of the inclined dichroic mirror 11 change according to the incidence angel on the inclined dichroic mirror 11, and uneven color occurs in the photographed image. In this respect, by correcting the uneven color, it is possible to acquire an appropriate image in which the uneven color is reduced.

The control apparatus 80 may correct a shift of a detection wavelength caused by a boundary between a wavelength band in which the transmittance and the reflectance change according to the change in wavelength and a wavelength band in which the transmittance and the reflectance do not change. Such a boundary has optical characteristics different from those in a wavelength band in which the transmittance, etc. changes according to the change in wavelength. Therefore, when a wavelength is derived using the same calculation formula as that for the wavelength band in which the transmittance, etc. changes according to the change in wavelength, there is concern that a calculation result may be different from the original wavelength. In this regard, by correcting the shift of the detection wavelength caused by such a boundary, a wavelength of light can be accurately derived and an appropriate image can be acquired.

The imaging element 14 may be a single imaging element having the first imaging region and the second imaging region. As a result, a plurality of photographed images can be obtained by a simple configuration using the single imaging element.

Even though the embodiment of the invention has been described above, the invention is not limited to the embodiment. For example, in the embodiment, a description has been given on the assumption that the dichroic mirrors 50 and 60 separate light from the sample into light including a red wavelength component, light including a green wavelength component, and light including a blue wavelength component (RGB), and each light ray is photographed by a separate imaging unit. However, the invention is not limited thereto. That is, light from an observation target (sample) may be photographed without being separated into the three colors of RGB.

In such a configuration, an inclined dichroic mirror provided at a previous stage of an area sensor, which is an imaging element, has a wavelength band (edge shift width), in which the light transmittance (and reflectance) changes according to a change in wavelength, corresponding to all three colors of RGB, for example, 400 to 900 nm.

Figure 7:
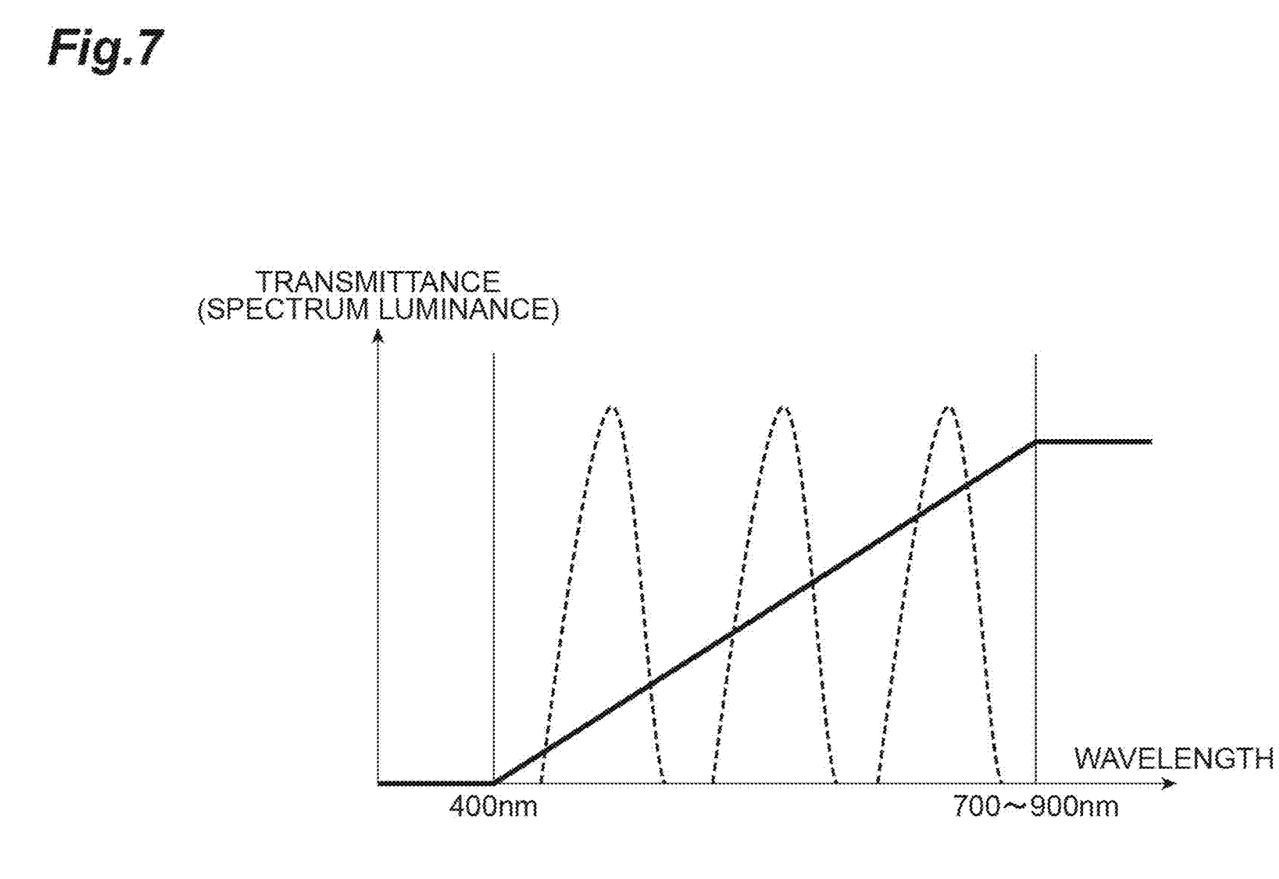
FIG. 7 is a diagram for describing characteristics of an inclined dichroic mirror according to a modification.

FIG. 7 is a diagram for describing characteristics of an inclined dichroic mirror according to a modification. In FIG. 7, the horizontal axis indicates the wavelength, and the vertical axis indicates the transmittance (in the case of the inclined dichroic mirror) and the spectral intensity (in the case of a spectrum of light). In an example illustrated in FIG. 7, in a specific wavelength band (wavelength band of 400 to 900 nm), the transmittance (and reflectance) of light gently changes according to a change in wavelength, and in a wavelength band other than the specific wavelength (that is, on a lower wavelength side of 400 nm and a higher wavelength side of 900 nm), the transmittance (and reflectance) of light is constant regardless of the change in wavelength. As illustrated in FIG. 7, in the inclined dichroic mirror, a wavelength band (edge shift width) in which the light transmittance (and reflectance) changes according to the change in wavelength includes all of a wavelength band of light including a red wavelength component (wavelength band illustrated on a right side in FIG. 7), a wavelength band of light including a green wavelength component (wavelength band illustrated at a center in FIG. 7), and a wavelength band of light including a blue wavelength component (wavelength band illustrated on a left side in FIG. 7).

Figure 8:
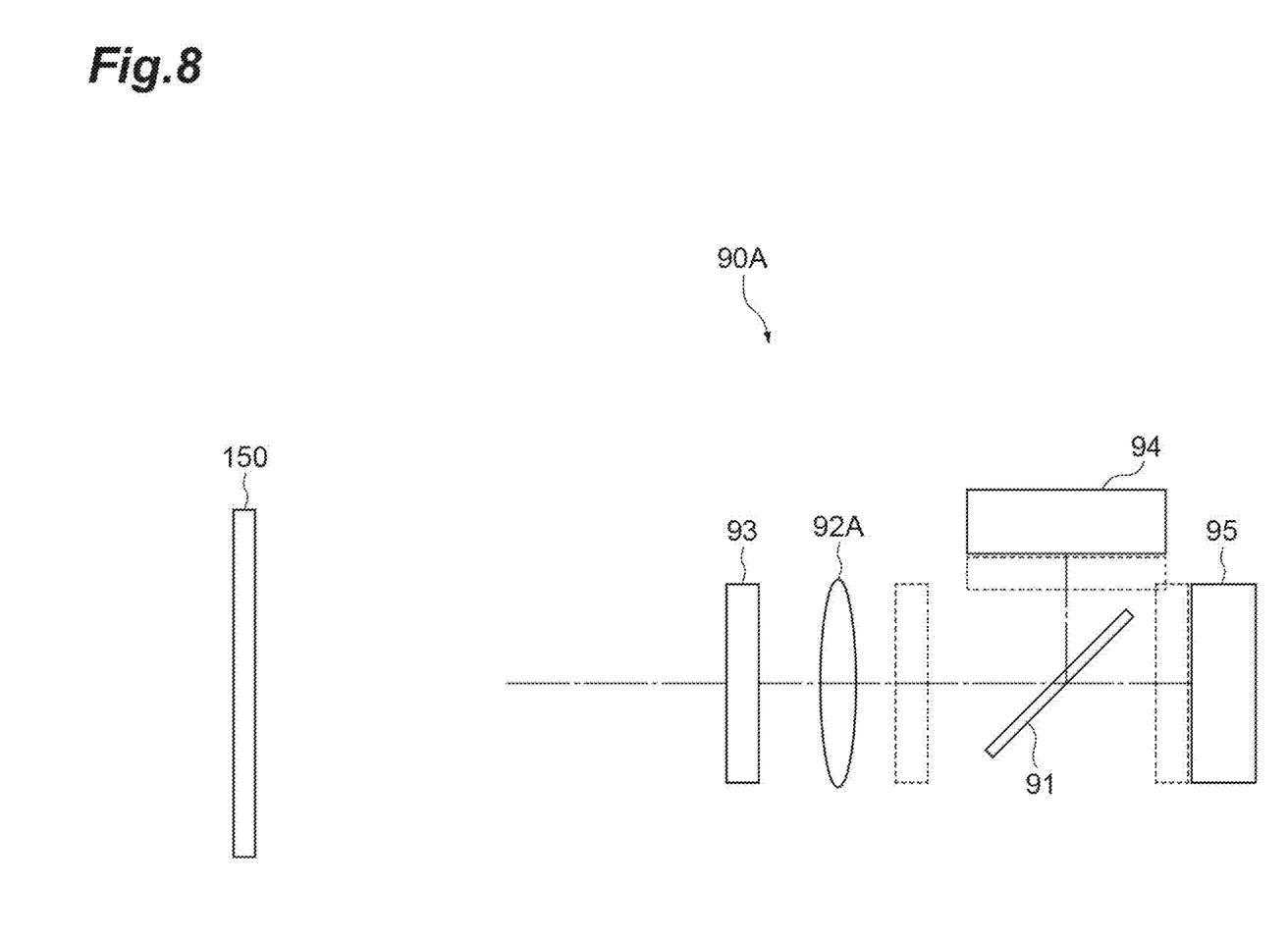
FIG. 8 is a diagram schematically illustrating a camera system according to a modification.

An example of a camera system (imaging unit) using an inclined dichroic mirror having the characteristics illustrated in FIG. 7 will be described with reference to FIG. 8. FIG. 8 is a diagram schematically illustrating a camera system 90A according to a modification.

As illustrated in FIG. 8, the camera system 90A includes an inclined dichroic mirror 91 (separation optical element), a finite focus lens (finite distance correction lens) 92A, a bandpass filter 93, an area sensor 94 (second imaging portion), and an area sensor 95 (first imaging portion).

The finite focus lens 92A is a lens that collects light (light emission) from a sample 150 (object) to be observed. A distance from the finite focus lens 92A to the area sensor 94 and a distance from the finite focus lens 92A to the area sensor 95 are set to predetermined values. Light passing through the finite focus lens 92A is incident on the inclined dichroic mirror 91.

The bandpass filter 93 is a provided, for example, at a previous stage (upstream) of the finite focus lens 92A, and is a filter that removes light outside a predetermined wavelength range. The bandpass filter 93 removes light having a wavelength outside a range of, for example, 400 to 900 nm. A plurality of bandpass filters 93 may be provided. The bandpass filter 93 may be provided in a region indicated by a broken line in FIG. 8, that is, a region at a subsequent stage (downstream) of the finite focus lens 92A and at a previous stage (upstream) of the inclined dichroic mirror 91, or may be provided in a region at a previous stage (upstream) of the area sensors 94 and 95 and at a subsequent stage (downstream) of the inclined dichroic mirror 91. Note that when the bandpass filter 93 is provided at each of previous stages of the area sensors 94 and 95, the two bandpass filters 93 and 93 have the same characteristics. Further, the camera system 90A may be provided with a plurality of bandpass filters 93 configured to be switchable according to light from the sample 150. The plurality of bandpass filters 93 in this case mutually has different wavelength bands for filtering from each other (details will be described later).

The inclined dichroic mirror 91 is a mirror generated using a specific optical material, and is a mirror that separates light from the sample 150 by transmitting and reflecting the light according to wavelengths, and has the transmittance and reflectance changing in a predetermined wavelength width. In the inclined dichroic mirror 91, as illustrated in FIG. 7, a wavelength band (edge shift width) in which the light transmittance (and reflectance) changes according to the change in wavelength includes all of a wavelength band of light including a red wavelength component, a wavelength band of light including a green wavelength component, and a wavelength band of light including a blue wavelength component. That is, the "predetermined wavelength width" of the inclined dichroic mirror 91 described above includes all of a wavelength band of light including a red wavelength component, a wavelength band of light including a green wavelength component, and a wavelength band of light including a blue wavelength component.

The area sensor 94 photographs light reflected by the inclined dichroic mirror 91. The area sensor 95 photographs light transmitted through the inclined dichroic mirror 91. A wavelength range in which the area sensors 94 and 95 have sensitivity corresponds to a wavelength band (edge shift width) in which the light transmittance (and reflectance) changes according to a change in wavelength in the inclined dichroic mirror 91. The area sensors 94 and 95 are, for example, monochrome sensors or color sensors (details will be described later).

Photographing results (images) by the area sensors 94 and 95 are output to a control apparatus (not illustrated). For example, a process for obtaining the wavelength center of gravity, a correction process, and a sample quality determination process in the control apparatus (not illustrated) may be the same as the processes in the control apparatus 80 described in the embodiment.

The correction process will be described. In the inclined dichroic mirror 91 or the bandpass filter 93, when light is obliquely incident (when not in a pupil position of an objective lens), light incident on each pixel is transmitted partially rather than entirely, and there is a possibility that a transmission wavelength may shift due to unevenness of in-plane uniformity of the inclined dichroic mirror 91 or the bandpass filter 93. On the contrary, when a wavelength characteristic is distorted from a straight line since light from a plurality of directions incidents on the inclined dichroic mirror 91, there is an effect of smoothing the wavelength characteristic. As a countermeasure against unevenness of surface uniformity of the inclined dichroic mirror 91 or the bandpass filter 93, it is conceivable to cause light of the same wavelength to uniformly enter a field of view in advance to calculate an in-plane wavelength distribution, thereby measuring and correcting the shift amount from an incident wavelength.

As a specific aspect of the camera system 90A, for example, three aspects described below can be considered.

First, the camera system 90A may include one type of bandpass filter 93 (one type of range of wavelength bands to be filtered) and area sensors 94 and 95, which are monochrome sensors. In this case, the bandpass filter 93 removes light having a wavelength outside a range of, for example, 400 to 900 nm. In such a configuration, in light incident on the area sensors 94 and 95, three RGB colors may be mixed. In this case, the control apparatus (not illustrated) obtains an averaged wavelength center of gravity in light in a wavelength band transmitted through the bandpass filter 93 (light in which three RGB colors are mixed). Further, when light rays of mutually different wavelength bands (light rays of respective RGB) are spatially separated (when the light rays do not overlap on an image), the control apparatus (not illustrated) can obtain a wavelength center of gravity with high accuracy with regard to each wavelength band. Specifically, a wavelength center of gravity of color of each pixel of a TV, a display, etc. can be obtained with high accuracy in a unit of nm according to this aspect.

Second, the camera system 90A may include a plurality of types of bandpass filters 93 having mutually different wavelength bands for filtering, and area sensors 94 and 95, which are monochrome sensors. The plurality of types of bandpass filters 93 in this case is provided so as to be able to be taken in and out (switched) according to light emission from the sample 150. In such a configuration, when the sample 150 outputs light emission having a wide spectrum (there is an overlap), by switching and using a plurality of types of bandpass filters 93, the control apparatus (not illustrated) can obtain a wavelength center of gravity of light only in a specific wavelength band (wavelength band corresponding to each bandpass filter 93). That is, the control apparatus (not illustrated) obtains a wavelength center of gravity of only a red wavelength component when the bandpass filter 93 for removing light having a wavelength other than a wavelength band of the red wavelength component (for example, 700 to 900 nm) is set, obtains a wavelength center of gravity of only a green wavelength component when the bandpass filter 93 for removing light having a wavelength other than a wavelength band of the green wavelength component (for example, 550 to 700 nm) is set, and obtains a wavelength center of gravity of only a blue wavelength component when the bandpass filter 93 for removing light having a wavelength other than a wavelength band of the blue wavelength component (for example, 400 to 550 nm) is set. Specifically, for example, for a light source that realizes a white LED by a blue LED and a fluorescent agent, by the second configuration, it is possible to obtain a wavelength center of gravity of only the blue LED, and to obtain a wavelength center of gravity of only the fluorescent agent.

Third, the camera system 90A may include one type of bandpass filter 93 (one type of range of wavelength band to be filtered) and area sensors 94 and 95, which are color sensors. In this case, the bandpass filter 93 removes light having a wavelength outside a range of, for example, 400 to 900 nm. In such a configuration, in light incident on the area sensors 94 and 95, which are color sensors, three RGB colors may be mixed. A color sensor is equipped with a Bayer filter (RGB three-color filter) for each pixel. In this way, each of light-receiving elements of the area sensors 94 and 95, which are color sensors, can acquire each of light having only a red wavelength component, light having only a green wavelength component, and light having only a blue wavelength component. According to such a configuration, a wavelength center of gravity can be appropriately obtained (that is, an appropriate inspection can be performed) for a color expressed by superimposing a plurality of wavelengths. Normally, colors of printing and light emission are made by superimposing three RGB colors according to a human eye. By calculating a wavelength center of gravity for each of the colors superimposed in this way, a mixed color may be inspected with high accuracy. Note that centers of gravity of more wavelengths can be inspected at the same time by further combining a hyperspectral camera as an imaging portion. For example, a hyperspectral camera includes a spectroscope and an imaging portion.

Figure 9:
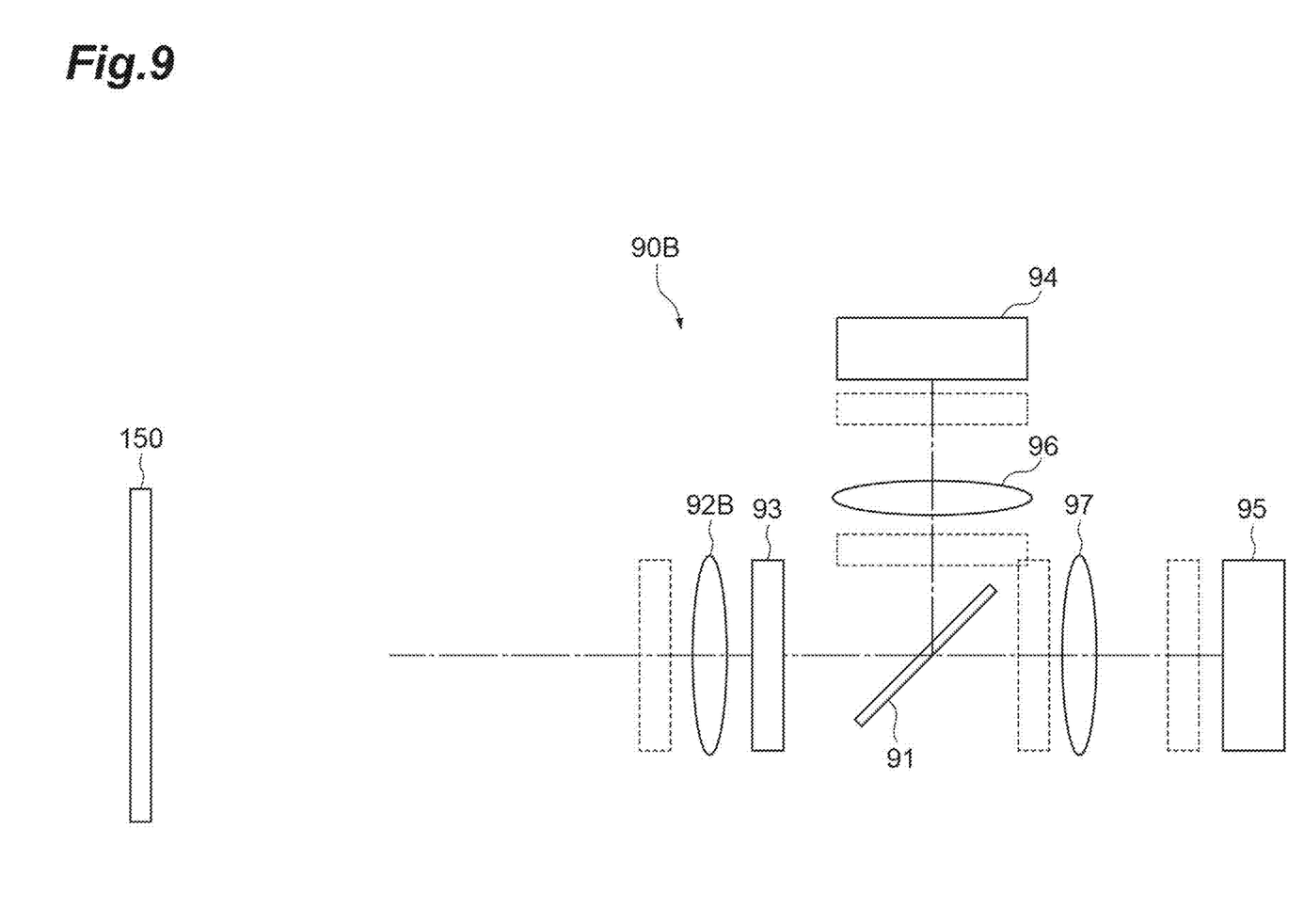
FIG. 9 is a diagram schematically illustrating a camera system according to a modification.

Another example of a camera system (imaging unit) using an inclined dichroic mirror having the characteristics illustrated in FIG. 7 will be described with reference to FIG. 9. FIG. 9 is a diagram schematically illustrating a camera system 90B according to another modification. Hereinafter, a difference from the configuration illustrated in FIG. 8 will be mainly described.

As illustrated in FIG. 9, the camera system 90B includes an inclined dichroic mirror 91 (separation optical element), an infinity focus lens (infinity correction lens) 92B, a bandpass filter 93, an area sensor 94 (second imaging portion), an area sensor 95 (first imaging portion), and imaging lenses 96 and 97. Configurations of the inclined dichroic mirror 91 and the area sensors 94 and 95 are similar to those in the camera system 90A described above.

The infinite focus lens 92B is a collimator lens that converts light (light emission) from the sample 150 (object) to be observed into parallel light. The infinite focus lens 92B is aberration-corrected so that parallel light can be obtained. The parallel light output from the infinite focus lens 92B is incident on the inclined dichroic mirror 91.

The imaging lens 96 is a lens that forms an image of light transmitted through the inclined dichroic mirror 91 on the area sensor 94. The imaging lens 97 is a lens that forms an image of light transmitted through the inclined dichroic mirror 91 on the area sensor 95.

For example, the bandpass filter 93 is provided at a subsequent stage (downstream) of the infinite focus lens 92B and at a previous stage (upstream) of the inclined dichroic mirror 91, and is a filter that removes light outside a predetermined wavelength range. The bandpass filter 93 removes light having a wavelength outside a range of, for example, 400 to 900 nm. A plurality of bandpass filters 93 may be provided. The bandpass filter 93 may be provided in a region indicated by a broken line in FIG. 9, that is, may be provided in a region at a previous stage (upstream) of the infinity focus lens 92B, provided in a region at a previous stage (upstream) of the area sensors 94 and 95 and at a subsequent stage (downstream) of the imaging lenses 96 and 97, or provided in a region at a previous stage (upstream) of the imaging lenses 96 and 97 and at a subsequent stage (downstream) of the inclined dichroic mirror 91. Note that the bandpass filters 93 provided at previous stages of the area sensors 94 and 95, respectively, have the same characteristics, and the bandpass filters 93 provided at the previous stages of the imaging lenses 96 and 97, respectively, have the same characteristics.

With regard to the camera system 90B using the infinite focus lens 92B described above, the above-mentioned three aspects may be considered as specific aspects similarly to the camera system 90A.

As described above, the camera system (imaging unit) according to the modification includes the separation optical element that separates light from an object by transmitting or reflecting the light according to wavelengths and has the transmittance and reflectance changing in a predetermined wavelength width, the first imaging portion that photographs light transmitted through the separation optical element, and the second imaging portion that photographs light reflected by the separation optical element.

As described above, by using the separation optical element, the transmittance and reflectance of which change according to the wavelengths, it is possible to appropriately separate light having a narrow wavelength width, and to appropriately obtain a wavelength center of gravity according to a photographing result in the imaging portion. Further, unlike the aspects described in the embodiment, it is possible to adopt a configuration in which light passing through the separation optical element is directly received by the imaging portions (the first imaging portion and the second imaging portion) without change, and thus it is possible to realize miniaturization of the camera system.

Further, in the camera system according to the modification, a wavelength range in which the first imaging portion and the second imaging portion have sensitivity corresponds to a wavelength range in which the transmittance and reflectance change in the separation optical element. According to such a configuration, a change (difference) in wavelength can be appropriately acquired from a photographing result in the imaging portion, and a wavelength center of gravity can be appropriately obtained.

Further, the camera system according to the modification includes a plurality of types of bandpass filters configured to be switchable according to light from an object. For example, when light emission having a wide spectrum (there is an overlap) is output from an object, by a plurality of types of bandpass filters switched and used, the control apparatus (not illustrated) can obtain a wavelength center of gravity of light only in a specific wavelength band (wavelength band corresponding to each bandpass filter). That is, the control apparatus (not illustrated) can obtain a wavelength center of gravity of only a red wavelength component when the bandpass filter for removing light having a wavelength other than a wavelength band of the red wavelength component is set, obtain a wavelength center of gravity of only a green wavelength component when the bandpass filter for removing light having a wavelength other than a wavelength band of the green wavelength component is set, and obtain a wavelength center of gravity of only a blue wavelength component when the bandpass filter for removing light having a wavelength other than a wavelength band of the blue wavelength component is set.

REFERENCE SIGNS LIST

1: measurement apparatus (imaging unit), 11, 21, 31: inclined dichroic mirror (separation optical element), 12, 22, 32: total reflection mirror (reflection optical element), 14, 24, 34: imaging element (imaging portion), 80: control apparatus (processing unit and analysis unit).

The invention claimed is:

1. An imaging unit comprising:
    a separation optical element configured to separate light from an object by transmitting or reflecting the light according to wavelengths, an edge shift width of the separation optical element having a predetermined width, the edge shift width being a width of a wavelength band in which a transmittance and a reflectance change linearly according to a change in wavelength;
    a first area sensor configured to capture the light transmitted through the separation optical element;
    a second area sensor configured to capture the light reflected by the separation optical element; and
    a processer configured to derive a wavelength center of gravity of each wavelength based on a transmitted image captured by the first area sensor, a reflected image captured by the second area sensor, and the edge shift width of the separation optical element.

2. The imaging unit according to claim 1, wherein the processer stores in advance correction data considering optical characteristics related to a change in transmittance and reflectance with respect to a wavelength in the separation optical element, and corrects images captured by the first area sensor and the second area sensor using the correction data.

3. The imaging unit according to claim 1, wherein the processer receives correction data considering optical characteristics related to a change in transmittance and reflectance with respect to a wavelength in the separation optical element, and corrects images captured by the first area sensor and the second area sensor using the correction data.

4. The imaging unit according to claim 1, wherein the processer corrects uneven color caused by an incident angle of light on the separation optical element.

5. The imaging unit according to claim 1, wherein the processer corrects a shift of a detection wavelength caused by a boundary between a wavelength band in which a transmittance and a reflectance change according to a change in wavelength and a wavelength band in which the transmittance and the reflectance do not change.

6. The imaging unit according to claim 1, wherein the processer is configured to derive a wavelength difference with respect to a wavelength having a transmittance of 50% based on an amount of transmittance derived from the transmitted image, an amount of reflectance derived from the reflected image and the edge shift width, and derive the wavelength center of gravity based on the wavelength difference.

7. A measurement apparatus comprising:
    the imaging unit according to claim 1; and
    an analyzer configured to analyze a processing result in the imaging unit including an image corrected by the processer.

* * * * *